No. 738,692. PATENTED SEPT. 8, 1903.
P. MIELEKE.
DOUGH DIVIDING MACHINE.
APPLICATION FILED DEC. 30, 1902.
NO MODEL.

No. 738,692. Patented September 8, 1903.

UNITED STATES PATENT OFFICE.

PAUL MIELEKE, OF ODERBERG I. MARK, GERMANY.

DOUGH-DIVIDING MACHINE.

SPECIFICATION forming part of Letters Patent No. 738,692, dated September 8, 1903.

Application filed December 30, 1902. Serial No. 137,195. (No model.)

*To all whom it may concern:*

Be it known that I, PAUL MIELEKE, a subject of the Emperor of Germany, and a resident of Oderberg i. Mark, Germany, have invented certain new and useful Improvements in Dough-Dividing Machines, of which the following is a specification.

The present invention relates to a machine serving to divide the dough into pieces of equal size, to form the pieces, to place them upon a board, and to remove automatically the board charged with the pieces.

The new machine is shown in the accompanying drawings, in which—

Figure 1:
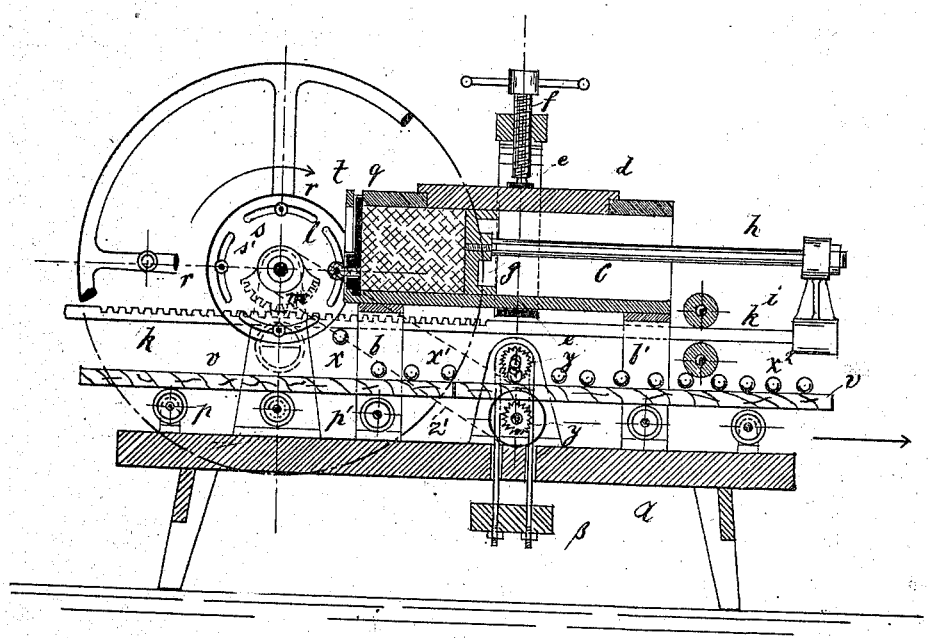
Figure 2:
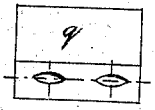
Figure 3:
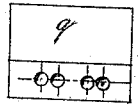

Figure 1 is a vertical longitudinal section through the machine. Figs. 2 and 3 are elevations of different molding-plates.

Upon a table $a$ a casing $c$, preferably of a rectangular cross-section, is supported by the uprights $b$ and $b'$, said casing being adapted to receive the dough, previously prepared by hand or otherwise. The dough is charged into the casing through an opening on the top, which is afterward closed by a lid $d$, which can be firmly secured in its seat by means of a screw-spindle $f$, passing through a nut in the strap $e$. A piston $g$ on a rod $h$ is adapted to act on the dough by pressure, the rod $h$ being solidly connected to rack-bar $k$ by means of a head $i$. Said rack-bar is in gear with a toothed sector $m$, which is keyed on the driving-shaft $l$ of the machine. By turning the crank of said driving-shaft the piston presses the dough through the openings of the front plate or molding-plate $q$, which is interchangeable, so that molding-plates with any form of opening may be used. (See Figs. 2 and 3.) The dough advancing through the openings of the molding-plate is then cut off by wires $r$, which are stretched between two disks $t$, secured on the shaft $l$, passing crosswise to the machine in such a way that they strike the advancing dough and cut it off from the mold-plate. The wires can be adjusted in position and two, four, or more may be employed in order to repeat the cutting action more or less frequently during the revolution of the shaft, so as to obtain larger or smaller pieces of dough $x$, which fall down upon a board $v$. This board is supported by rollers $p\ p'$, and a slow longitudinal motion is communicated to it by star-wheels $y\ y'$, one of which receives motion by means of a belt $z'$ (shown in dotted lines in Fig. 1) in the ordinary well-known manner. The star-wheel $y$ is journaled in bearings, which are weighted, as shown in Fig. 1, so as to produce a contact of the wheels with the board $v$ under pressure and thus to insure the engagement.

In order to adjust the cutting-wires in position or to increase their number, the disks $t$ are provided with circular concentric slots $s$, in which blocks can slide carrying the wires in suitable perforations. Nuts on the outside of the disks are used to secure the blocks with the wires in the adjusted position.

What I claim as my invention, and desire to secure by Letters Patent, is—

A machine for dividing dough, comprising a casing, provided with a presser-piston and an interchangeable mold-plate having in front of said mold-plate a driving-shaft with disks, provided with circular slots having adjustable sliding blocks therein, between which wires are stretched crosswise, so as to cut off the dough escaping from the mold-plate during the revolution of the driving-shaft, substantially as described.

In testimony whereof I affix my signature.

PAUL MIELEKE.

In presence of—
HENRY HASPER,
WOLDEMAR HAUPT.